United States Patent [19]
Fey et al.

[11] Patent Number: 6,057,883
[45] Date of Patent: May 2, 2000

[54] CIRCUIT FOR CONTROLLING THE PICTURE TUBE IN A TELEVISION RECEIVER

[75] Inventors: Bernd Fey; Helmut Sowig, both of Villingen-Schwenningen, Germany

[73] Assignee: Deutsche Thomson-Brandt GmbH, Villingen-Schwenningen, Germany

[21] Appl. No.: 08/972,873

[22] Filed: Nov. 18, 1997

[30] Foreign Application Priority Data

Nov. 26, 1996 [DE] Germany .......................... 196 48 886

[51] Int. Cl.⁷ .................................................. H04N 9/16
[52] U.S. Cl. ........................................ 348/377; 348/809
[58] Field of Search .................................... 348/377, 378, 348/380, 805, 808, 809; 358/242, 243, 64, 65, 74; H04N 9/16, 9/18, 9/20, 9/64

[56] References Cited

U.S. PATENT DOCUMENTS 4,704,631  11/1987  Bell ........................................ 348/377

FOREIGN PATENT DOCUMENTS

| | | |
|---|---|---|
| 24 59 442 | 12/1976 | Germany . |
| 3439704 | 5/1985 | Germany . |
| 3406632 | 8/1985 | Germany .......................... H04N 3/20 |
| 3510798 | 9/1985 | Germany . |
| 3705184 | 6/1989 | Germany . |
| 196 25 071 | 1/1997 | Germany . |
| 3-71784 | 3/1991 | Japan .............................. H04N 9/200 |
| 4-117793 | 4/1992 | Japan ................................ H04N 9/64 |

OTHER PUBLICATIONS

Giorgio Betti and Silvan Coccetti; Integrated Video Output Stages for Direct Driving of Color Tube Cathodes; 137–145.

*Primary Examiner*—David E. Harvey
*Attorney, Agent, or Firm*—Joseph S. Tripoli; Robert D. Shedd; Paul P. Kiel

[57] ABSTRACT

A circuit for controlling the picture tube in a television receiver. In order to generate a high peak white on the screen of the picture tube, it is desirable to drive the output amplifiers at full output. Because of tolerances, for example in the cutoff calibration, the transparency of the picture tube glass, fluctuations in the input signal etc., driving the video output stages to full output may drive the output stages into saturation and disturbances in the form of so-called smears can occur in the picture. The present invention permits the output stages to be driven to full output as far as the highest peak white without the output amplifiers going into saturation and causing disturbances in the form of smears in the picture. In particular, the outputs of the output amplifiers are each connected via a diode to a common circuit point with a voltage such that the amplitudes of the output voltages of the output amplifiers do not exceed, in the direction of white, a prescribed value corresponding to peak white. In a development, the circuit point is connected to a control terminal, serving to limit the beam current, of a video processor supplying the color signals.

8 Claims, 3 Drawing Sheets

CIRCUIT FOR CONTROLLING THE PICTURE TUBE IN A TELEVISION RECEIVER

BACKGROUND OF THE INVENTION

1. Field of the Invention

The invention relates to a circuit for controlling a picture tube in a television receiver.

2. Related Art

An important accordance with the preamble of claim 1. An important quality characteristic of the image reproduction in a television receiver is the maximum brightness which can be represented on the viewing screen, the so-called light at peak white. This light at peak white is limited in practice essentially by two limitations. Firstly, by the control range or the saturation limit of the RGB output stages controlling the picture tube and, secondly, by the maximum permissible drive of the picture tube.

In order to achieve the highest possible brightness, it is therefore necessary to set the drive of the picture tube, that is to say the amplification of the RGB signals controlling the picture tube, as high as possible in the direction of white. Substantial tolerances are active, in this case such as, for example, the cutoff calibration, the transparency of the picture tube glass and fluctuations in the input signal. Because of these tolerances, driving the video output stages to full output more or less reaches the saturation limit of the amplifiers. Furthermore, it has to be borne in mind that both the settings accessible to the customer such as brightness, contrast and colour saturation, and the ageing of the picture tube which is compensated by the dark current regulation can lead to further driving of the output stages.

If, now, one of the output stages driving the picture tube goes into saturation, so-called smears appear on the viewing screen in the corresponding colour in the form of an extension of a pixel or of an image area in the line direction. These smears occur principally for the colour red, because the picture tube requires the highest drive owing to the phosphorous sensitivity of the red gun.

In order to arrive at such saturation phenomena in the case of the said tolerances, it would therefore be necessary to observe a certain safety distance in driving the output amplifier to full output. However, this means in turn that the theoretically maximum possible drive to full output is not reached as a rule.

SUMMARY OF THE INVENTION

It is the object of the invention to provide a circuit for controlling the picture tube which permits the picture tube to be driven to full output in the direction of white without disturbances occurring in the picture owing to saturation of the output amplifiers in the form of smears. This object is achieved by means of the invention specified below. Advantageous developments of the invention are also specified below.

Thus, in the invention the outputs of the output amplifiers are each connected via a diode to a common circuit point having a voltage such that the amplitude of the output voltages of the output amplifiers does not exceed, in the direction of white, a prescribed value corresponding to peak white.

In the circuit according to the invention, it is thus ensured that the amplitude of the output voltage of each output amplifier does not reach with high accuracy the critical value for saturation of the output amplifier. The high accuracy is achieved owing to the fact that the saturation is monitored and prevented at the point, specifically at the output of the output amplifier, at which it occurs. All the tolerances of the upstream stages are thus captured and corrected. Since, because of the amplitude limitation by the diodes, the critical voltage value of the output voltage for saturation of the output amplifiers is now no longer reliably reached, the circuit can be designed for maximum driving of the picture tube to full output in the direction of white. The outlay on circuitry is slight and consists essentially only of three diodes and a few components for generating the said fixed voltage.

It is preferred for the three diodes for the three colour signals R, G, B to be connected to the same circuit point of a fixed voltage. This simplification in terms of circuitry is possible because the saturation voltages for the three output amplifiers are always virtually the same in practice. The fixed voltage is preferably stabilized by a zener diode. In a circuit which has been proved in practice, the circuit point carrying the fixed voltage is connected to earth via the parallel circuit of the zener diode and a capacitor, and connected to an operating voltage source via a resistor.

The circuit according to the invention is particularly suitable for an output amplifier in the form of the integrated circuit of type TEA 5101B from the SGS Thomson company. The particular suitability results from the fact that this output amplifier has a high static internal impedance which permits the limitation by the diodes.

In a development of the invention, the circuit point to which the diodes are connected is connected to a control terminal, serving to limit the beam current, of a video processor which supplies the colour signals R, G, B. It is preferable for the circuit point to be connected to the base of a first transistor, and for the collector thereof to be connected to the base of a second transistor whose collector/emitter path is situated between the control terminal of the video processor and earth. This development of the invention essentially has the following advantages:

It is particularly suitable when the output amplifiers for the colour signals R, G, B do rot have a satisfactorily high static internal impedance for the amplitude limitation. The contrast reduction via the beam current limitation permits a low outlay on circuitry. It is not necessary to maintain a reserve for driving to full output for tolerances between the integrated circuit for the video signals and the output stage output. It is then possible to drive the stages as far as the saturation limit. Instances of colour shading are avoided to the greatest possible extent. This solution is thus not a pure amplitude limitation, but controlled by virtue of the fact that the colour signals from the outputs of the output amplifiers are fed back via the threshold value circuit with the diodes to the control input, serving to control the beam current, of the video processor.

BRIEF DESCRIPTION OF THE DRAWINGS

The invention is explained below with the aid of the drawing, in which.

DETAILED DESCRIPTION

Figure 1:
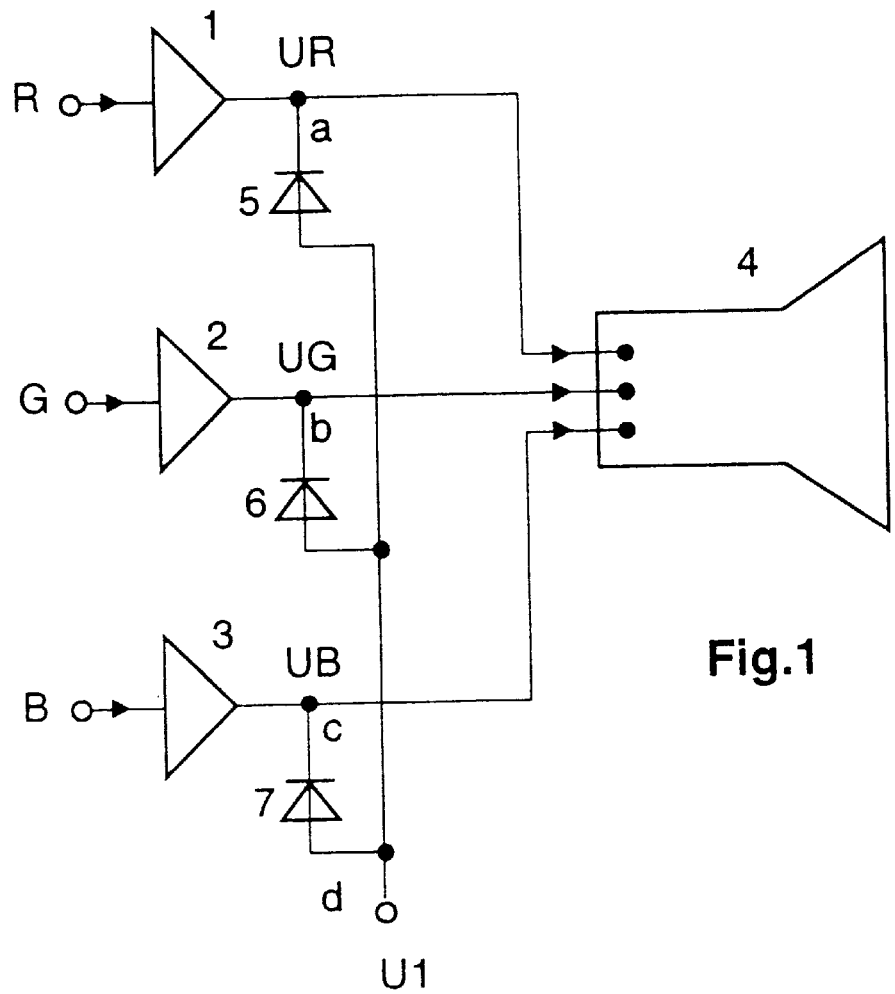
FIG. 1 shows a simplified block diagram of the circuit according to the invention.

In FIG. 1, the colour signals R, G, B reach the inputs of three output amplifiers 1, 2, 3. Their outputs a, b, c are connected to the cathodes of the picture tube 4. The output signals UR, UG, UB at the outputs a, b, c control the brightness of the picture tube 4, the brightness on the viewing screen increasing with decreasing amplitude of these voltages because of the drive at the cathodes.

The outputs a, b, c are connected via the diodes 5, 6, 7 to the point d of fixed voltage U1. The voltage U1 is at or slightly above the voltage value at which the amplifiers 1, 2, 3 reach saturation and can generate disturbances on the viewing screen in the form of smears. As soon as one of the voltages UR, UG or UB tries to reach or exceed the value U1 critical for saturation, the diode 5, 6 or 7 is respectively turned on and thus prevents the amplitude of the voltage UR, UG, UB from exceeding this critical value. The result is to avoid picture disturbances in the form of smears owing to saturation of the output amplifiers 1, 2, 3.

Figure 2:
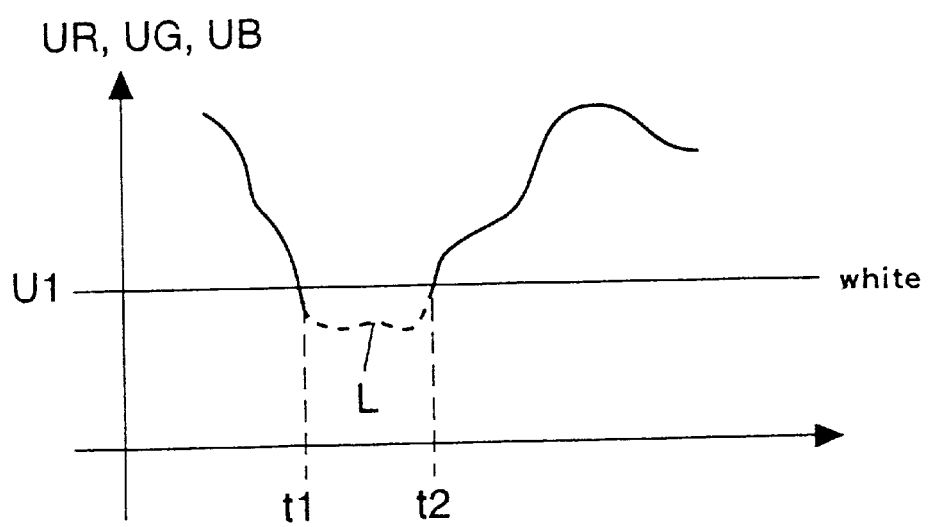
FIG. 2 shows curves to illustrate the mode of operation of the circuit according to FIG. 1.

FIG. 2 shows the characteristic of one of the voltages UR, UG or UB. It may be assumed that one of these voltages falls below the voltage value U1 in the time from t1 to t2, as is represented by the dashed line L. Saturation of the output amplifier would then occur during t1–t2, and disturbances would be generated in the picture. The diode 5, 6 or 7 respectively turned on now prevents the dashed voltage characteristic L between t1 and t2, and during this time limits the value of the voltage of UR, UG or UB to the voltage value U1, with the result that the disturbing saturation state is not reached.

Figure 3:
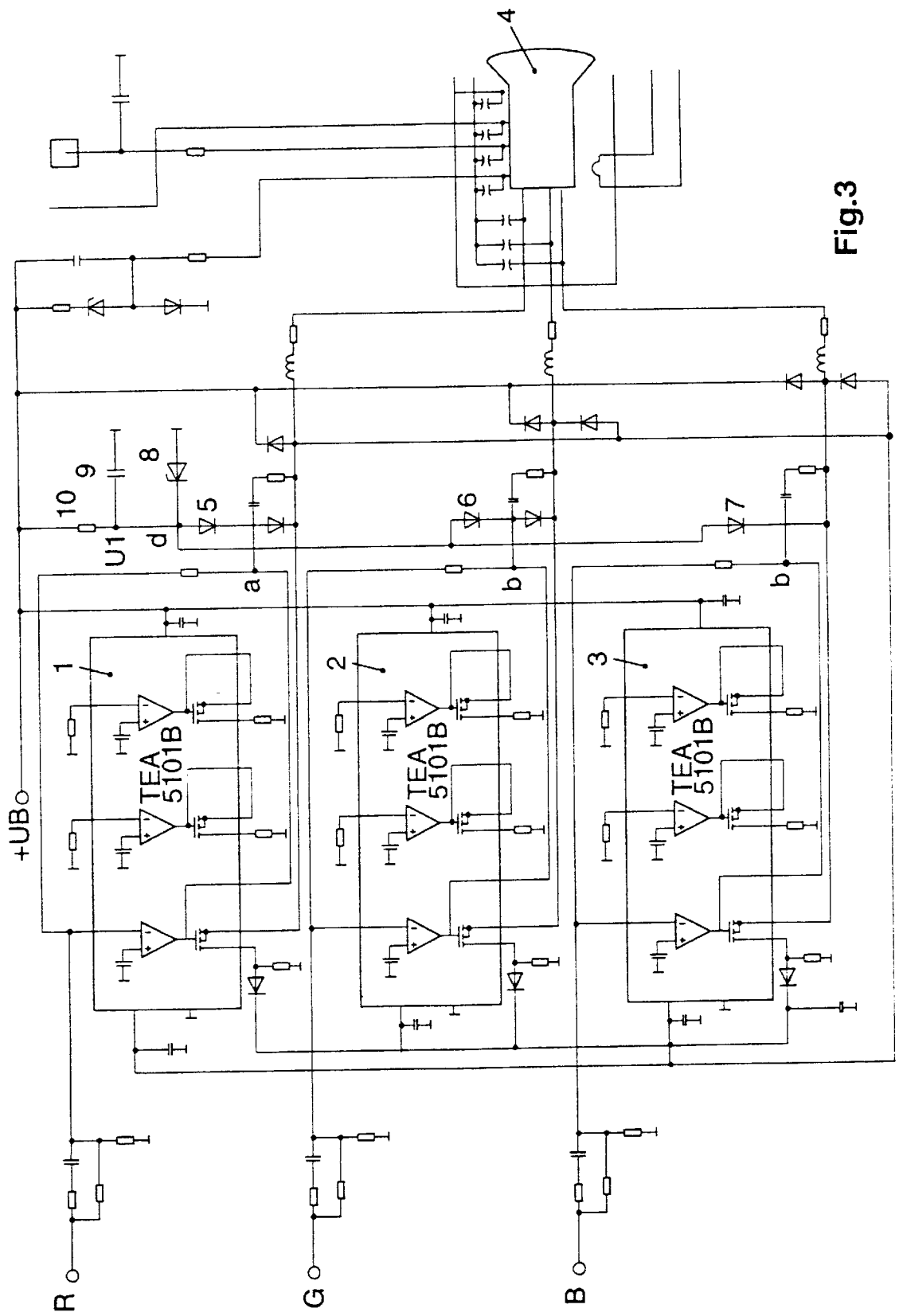
FIG. 3 shows a practically tested exemplary embodiment of the circuit according to the invention.

FIG. 3 shows a practically tested circuit for the block diagram according to FIG. 1. Three integrated circuits of type TEA 5101B from SGS Thomson serve as output amplifiers 1, 2, 3 in accordance with FIG. 1. This circuit is particularly suitable for applying the circuit according to the invention, because this integrated amplifier has a particularly high static internal impedance and thereby permits the amplitude limitation by means of the diodes. The circuit is less suitable for other amplifiers, which operate in a push-pull fashion and have a particularly low static internal impedance, because an excessively high current would then be required in the limiting diodes. The point d at which the voltage U1 is present, is earthed via the parallel circuit of the zener diode 8 and the capacitor 9 and connected to an operating voltage +UB via the resistor 10. The zener diode 8 stabilizes the voltage U1 at the value at which the saturation of the output amplifiers 1, 2, 3 just fails to occur.

Figure 4:
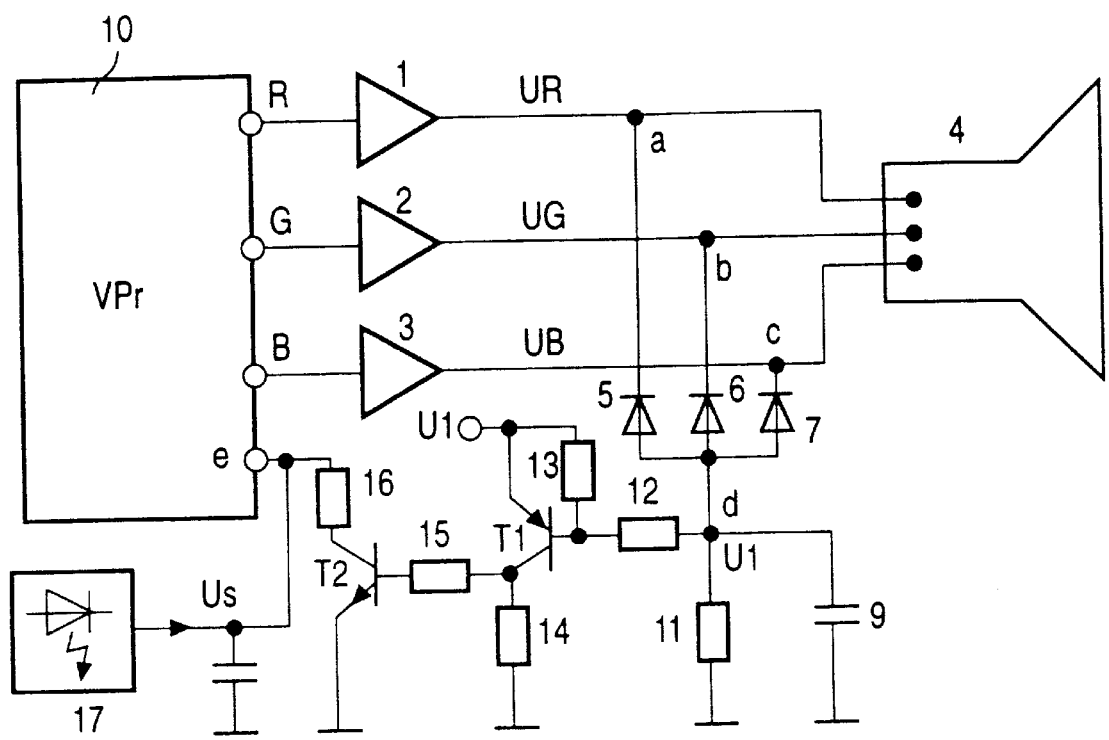
FIG. 4 shows a circuit diagram of a development of the invention.

FIG. 4 shows a circuit for the said development of the invention, which operates with true automatic control. The circuit point d carrying the voltage U1 is connected via the resistor 12 to the base of the transistor T1, which is connected, furthermore, to the operating voltage U1 via the resistor 13. The collector of the transistor T1 is earthed via the resistor 14 and connected via the resistor 15 to the base of the second transistor T2, whose collector is connected via the resistor 16 to the control input e of the video processor 10. Moreover, applied to the control input e is voltage Us which serves to limit beam current, represents the magnitude of the beam current and is derived from the stage 17 for the horizontal deflection and the generation of high voltage.

If one of the voltages UR, UG, UB undershoots the value of the voltage U1, apart from the forward voltage of the diodes 5, 6, 7, the respective diode 5 or 6 or 7 is switched on. As a result, the transistor T1 is also switched on, and its rising collector voltage at the resistor 14 switches on the transistor T2. The control voltage becoming effective at the control input e thereby reduces the contrast and consequently ensures that the disturbing saturation state described of the output amplifiers 1, 2, 3 is not reached. By contrast with the circuit according to FIG. 1, this circuit also operates satisfactorily even if the output amplifiers 1, 2, 3 do not have a high dynamic internal impedance.

We claim:

1. Circuit for controlling a picture tube in a television receiver, the circuit comprising:

a source of colour signals R, G, B;

output amplifiers coupled to the source of colour signals;

control electrodes coupled to the output amplifiers and to the picture tube, the outputs of the output amplifiers being connected via a diode to a circuit point with a fixed voltage such that the amplitude of the output voltage of the output amplifiers does not exceed, in the direction of white, a prescribed value corresponding to peak white and in that the fixed voltage is stabilized by a zener diode.

2. Circuit according to claim 1, wherein the three diodes for the three colour signals R, G, B are connected to a common circuit point of fixed voltage.

3. Circuit according to claim 2, wherein the circuit point is connected to earth via the parallel circuit of the zener diode and a capacitor, and is connected to an operating voltage source via a resistor.

4. Circuit according to claim 4, wherein the output amplifier has a high static internal impedance at the output.

5. Circuit according to claim 4, wherein the output amplifier is formed by an integrated circuit of type TEA 5101.

6. Circuit for controlling a picture tube in a television receiver, the circuit comprising:

a source of colour signals R, G, B;

output amplifiers coupled to the source of colour signals;

control electrodes coupled to the output amplifiers and to the picture tube, the outputs of the output amplifiers being connected via a diode to a circuit point with a fixed voltage such that the amplitude of the output voltage of the amplifiers does not exceed, in the direction of white, a prescribed value and in that the circuit point is connected to a terminal, serving to limit the beam current, of a processor supplying the colour signals R, B, G.

7. Circuit for controlling a picture tube in a television receiver, the circuit comprising:

a source of colour signals R, G, B;

output amplifiers coupled to the source of colour signals, control electrodes coupled to the output amplifiers and to the picture tube, the outputs of the output amplifiers being connected via a diode to a circuit point with a fixed voltage such that the amplitude of the output voltage of the amplifiers does not exceed, in the direction of white, a prescribed value and in that the circuit point is connected to the base of a first transistor, and the collector thereof is connected to the base of a second transistor whose collector/emitter path is situated between the control terminal of a video processor and earth.

8. Circuit according to claim 3, wherein the circuit point is connected to earth via the parallel circuit of the zener diode and a capacitor and is connected to an operating voltage source via a resistor.

* * * * *